US009942116B2

(12) United States Patent
Goldberg et al.

(10) Patent No.: US 9,942,116 B2
(45) Date of Patent: *Apr. 10, 2018

(54) INTERCONNECTING ELECTRONIC DEVICES FOR REPORTING DEVICE STATUS

(71) Applicant: International Business Machines Corporation, Armonk, NY (US)

(72) Inventors: Itzhack Goldberg, Hadera (IL); Erik Rueger, Ockenheim (DE); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,797

(22) Filed: Jul. 14, 2016

(65) Prior Publication Data
US 2017/0155564 A1    Jun. 1, 2017

Related U.S. Application Data

(63) Continuation of application No. 14/953,534, filed on Nov. 30, 2015, now Pat. No. 9,444,703.

(51) Int. Cl.
*G06F 15/173* (2006.01)
*H04L 12/26* (2006.01)

(52) U.S. Cl.
CPC ................. *H04L 43/065* (2013.01)

(58) Field of Classification Search
CPC ... G06F 11/1612; G06F 11/2046; H04L 69/28
See application file for complete search history.

(56) References Cited

U.S. PATENT DOCUMENTS

| 5,822,534 A | 10/1998 | Yamunachari et al. |
| 5,995,916 A | 11/1999 | Nixon et al. |
| 6,006,016 A | 12/1999 | Faigon et al. |

(Continued)

FOREIGN PATENT DOCUMENTS

| DE | 202014004802 U1 | 8/2014 |
| WO | 2012092099 A3 | 9/2012 |
| WO | 2014121294 A1 | 8/2014 |

OTHER PUBLICATIONS

Cavallini, A. "iBeacons Bible 1.0," https://meetingofideas.files.wordpress.com/2013/12/ibeabons-bible-1-0.pdf, pp. 1-15.

(Continued)

*Primary Examiner* — Ranodhi Serrao
(74) *Attorney, Agent, or Firm* — Nicholas D. Bowman (57) ABSTRACT

A first electronic device can receive an identifying signal broadcast from a second electronic device located within a wireless communication range of the first electronic device, and in response, establish a first, local electronic communication path between the first and second electronic devices. The first electronic device can then receive a set of status data from the second electronic device over the local electronic communication path. The first electronic device can then establish a second, remote electronic communication path to a remote server and subsequently transmit, over the remote electronic communication path, the status data from the second electronic device along with status data from the first electronic device.

9 Claims, 5 Drawing Sheets

(56) References Cited

U.S. PATENT DOCUMENTS

| | | | |
|---|---|---|---|
| 6,148,335 | A | 11/2000 | Haggard et al. |
| 6,230,199 | B1 | 5/2001 | Revashetti et al. |
| 6,397,359 | B1 | 5/2002 | Chandra et al. |
| 6,427,132 | B1 | 7/2002 | Bowman-Amuah |
| 6,502,131 | B1 | 12/2002 | Vaid et al. |
| 6,505,244 | B1 | 1/2003 | Natarajan et al. |
| 6,539,427 | B1 | 3/2003 | Natarajan et al. |
| 6,584,502 | B1 | 6/2003 | Natarajan et al. |
| 6,611,867 | B1 | 8/2003 | Bowman-Amuah |
| 6,675,128 | B1 | 1/2004 | Hellerstein |
| 7,043,546 | B2 | 5/2006 | Smith et al. |
| 7,200,112 | B2 | 4/2007 | Sundar et al. |
| 8,468,223 | B2 | 6/2013 | Garrett et al. |
| 2001/0051890 | A1 | 12/2001 | Burgess |
| 2002/0099578 | A1 | 7/2002 | Eicher, Jr. et al. |
| 2002/0099579 | A1 | 7/2002 | Stowell et al. |
| 2002/0099580 | A1 | 7/2002 | Eicher, Jr. et al. |
| 2002/0099598 | A1 | 7/2002 | Eicher, Jr. et al. |
| 2002/0143931 | A1 | 10/2002 | Smith et al. |
| 2002/0161611 | A1 | 10/2002 | Price et al. |
| 2003/0046388 | A1 | 3/2003 | Milliken |
| 2014/0269465 | A1 | 9/2014 | Ballantyne et al. |
| 2014/0282967 | A1 | 9/2014 | Maguire et al. |
| 2014/0317710 | A1 | 10/2014 | Sager et al. |
| 2015/0040198 | A1 | 2/2015 | Gopalakrishnan et al. |
| 2015/0081487 | A1 | 3/2015 | Porter et al. |
| 2015/0170133 | A1 | 6/2015 | Love et al. |
| 2016/0174038 | A1 | 6/2016 | Menardais et al. |
| 2016/0192151 | A1 | 6/2016 | Marri Sridhar et al. |

OTHER PUBLICATIONS

Namiot, et al., "On Geo Location Services for Telecom Operators," Lomonsow Moscow State University, Moscow, Russia, pp. 1-8, arXiv preprint arXiv:1505.01111 (2015).

Wikipedia, "iBeacon," https://en.wikipedia.org/wiki/IBeacon, last printed Oct. 15, 2015 3:56 PM, 7 pages.

Mell, P. et al., "The NIST Definition of Cloud Computing," Recommendations of the National Institute of Standards and Technology, U.S. Department of Commerce, Special Publication 800-145, 7 pgs., Sep. 2011.

Goldberg et al., "Interconnecting Electronic Devices for Reporting Device Status", U.S. Appl. No. 14/953,534, filed Nov. 30, 2015.

IBM, List of IBM Patents or Patent Applications Treated as Related, Jul. 13, 2016, 2 pages.

INTERCONNECTING ELECTRONIC DEVICES FOR REPORTING DEVICE STATUS

BACKGROUND

The present disclosure generally relates to reporting status of electronic devices. In particular, this disclosure relates to enhanced reliability electronic device status reporting to a remote location.

A computer network includes a set of computers and/or other types of electronic equipment connected together for the purpose of sharing resources such as data. Computer networks can be "local" networks, in cases where the interconnected computers are relatively close to each other, or "wide area" networks, in cases where the interconnected computers are separated by a greater distance. The Internet can be considered an example of a "wide area" network.

Computers connected to a network can be referred to as "nodes". The interconnection between computers in a network can include cabling such as Ethernet cable, or wireless connection through transmitted and received radio waves. Computers connected in a network can share resources, such as access to the Internet, printers and file servers.

SUMMARY

Embodiments may be directed towards a method. The method may include receiving, with a first electronic device, an identifying signal broadcast from a second electronic device and establishing, in response to the receiving the identifying signal, a first electronic communication path between the first electronic device and the second electronic device. The method may also include receiving, at the first electronic device, a second set of status data of the second electronic device, the second set of status data transmitted from the second electronic device over the first electronic communication path. The method may also include establishing a second electronic communication path between the first electronic device and a remote server. The method may also include transmitting, over the second electronic communication path, from the first electronic device to the remote server, a first set of status data of the first electronic device and the second set of status data.

Embodiments may also be directed towards a first electronic device. The first electronic device may include a transmitting element configured to broadcast a first identifying signal, a receiving element configured to receive a second identifying signal broadcast from a second electronic device, and at least one processor circuit. The processor circuit can be configured to establish, in response to receiving the second identifying signal broadcast from the second electronic device, a first electronic communication path between the first electronic device and the second electronic device. The processor circuit can also be configured to receive, at the first electronic device, a second set of status data of the second electronic device, the second set of status data transmitted from the second electronic device over the first electronic communication path. The processor circuit can also be configured to establish a second electronic communication path between the first electronic device and a remote server. The processor circuit can also be configured to transmit, over the second electronic communication path, from the first electronic device to the remote server, a first set of status data of the first electronic device and the second set of status data.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing enhanced status reporting for electronic devices and systems used in a corporate environment such as a data center or information technology (IT) equipment installation. Such electronic devices and systems may include, but are not limited to, computers, servers and network hardware devices and peripherals, which may be used to provide data to clients attached to the IT installation through a network. While not necessarily limited thereto, embodiments discussed in this context can facilitate an understanding of various aspects of the disclosure. Certain embodiments may also be directed towards other equipment and associated applications, such as providing enhanced status reporting for electronic devices and systems used in a small office/home office (SOHO) environment. Electronic devices in such an environment may include servers, desktop personal computers, laptops and handheld electronic devices such as smartphones, which may be used in a wide variety of computational and data processing applications. Embodiments may also be directed towards providing enhanced status reporting for electronic devices and systems used in consumer electronics and home entertainment applications.

The term "call home system" is used herein in reference to a system designed to electronically relay the status of electronic devices and/or systems located at a customer site to a computer or server monitored by an equipment maintenance provider (EMP).

For ease of discussion, the terms "Support Services Representative" (SSR) and "Customer Engineer" (CE) are used interchangeably herein, with reference to an individual employed by an EMP. An SSR or CE may periodically visit a customer site to perform on-site service such as hardware and software installation, maintenance and upgrades. For ease of discussion, the terms "electronic product", "electronic device" and "electronic system" may be used interchangeably herein, with reference to various pieces of electronic hardware, e.g., a server, computer system, peripheral or network device, which may be used within a customer site.

Electronic devices and systems may be configured to periodically communicate with a computer or server maintained and monitored by an EMP. Such communication can be referred to as a "call home" service or function. An electronic system, for example, a computer or server, can be configured to periodically send status messages to the EMP. In response to receiving the status messages, the EMP can initiate software upgrades, hardware upgrades, respond to equipment failure or security issues and generally provide service and support for the electronic device or system. In some scenarios, the EMP can be the manufacturer of the electronic system or device. In other scenarios, the EMP can be a "third-party" entity having a contractual arrangement with the owner and/or user of the electronic system(s), to provide maintenance and services for the electronic system(s).

The use of a call home service can enable a number of features beneficial to the electronic system(s) and to its owners/users. For example, call home-enabled devices and systems can perform proactive diagnostics on their own components to provide alerts and remediation advice when an issue is detected. A call home system can identify problems on a customer's electronic devices/systems before they can affect business operations and can securely communicate vital system information to an EMP server. The EMP server can be configured to analyze and respond to customer issues by using an electronic product knowledge base. Such a knowledge base can be accumulated from multiple similar, deployed and monitored electronic systems, and can incorporate, for example, manufacturing and technical support information related to software, hardware, configuration and security issues.

Call home services and systems may be particularly useful in view of current trends of electronic systems having an increasing number of CRUs (Customer Replaceable Units) operational in the field. A CRU is a component of an electronic device or system which is deemed to be accessible and replaceable by the customer. Call home services can be used, for example, to provide automated or semi-automated diagnostics, customer assistance, replacement instructions, inventory and configuration information, product alerts and shipment of parts to replace failed CRUs.

Call home systems may be useful for commercial IT products, SOHO-related products, consumer products such as home entertainment systems, and many other types of related electronic products and systems. A wide variety of electronic products and systems can be configured to send system status logs to the product manufacturer or other EMP. Such system logs can enable proactive planning for mitigating failure and maintenance exposures and provide usage information to the manufacturer that can be used to improve the electronic system. The call home system can be configured to deliver information related to the status of electronic devices and/or systems, for example, to network administrators and system users. In a customer site having multiple electronic devices or systems, the call home system can provide information about the devices on the customer network that have the call home capability enabled.

In some applications, a call home system can include multiple electronic devices or systems, such as computers, servers and network components, which may be located near each other, for example, in a corporate data center or SOHO environment. Such multiple devices or systems may or may not be interconnected, for example, through a wireless network or through a local-area network (LAN).

A call home system embedded within a group of related electronic devices or systems located remote to the EMP can provide benefits to both the equipment user and the EMP. However, if some of the electronic systems cannot reliably connect to the EMP server to relay status information, the benefits, as described above, provided by the call home system can be diminished or lost.

In certain electronic system installations, some electronic systems may not be configured to communicate through security measures or devices within the customer's site and/or within the EMP site. Security measures or devices can include, for example, firewalls and digital certificates required for access to a network interconnecting the customer site and the EMP site. If certain electronic systems located at a customer site lack access to the EMP server, then status data for these electronic systems may not be received in a timely manner by the server. As a result, appropriate upgrades, failure diagnostics, service, repair and other actions may not be undertaken, or may be delayed significantly.

According to embodiments of the present disclosure, a call home system can be configured to provide local interconnection of electronic devices and systems at a customer site, and to enable the sharing of electronic device status data between the locally interconnected devices. Once one of the electronic devices establishes a connection with the EMP server, the connected electronic device can act as a bridge, and subsequently transmit, by proxy, the status data collected from each of the locally connected electronic devices. The consolidation and transmission of the electronic device status data, through whichever electronic device can first establish a remote connection to the EMP server, can result in a reliable transfer of status data pertaining to all the electronic devices. Such a transfer can result in the appropriate service, maintenance and upgrade actions being initiated.

Figure 1:
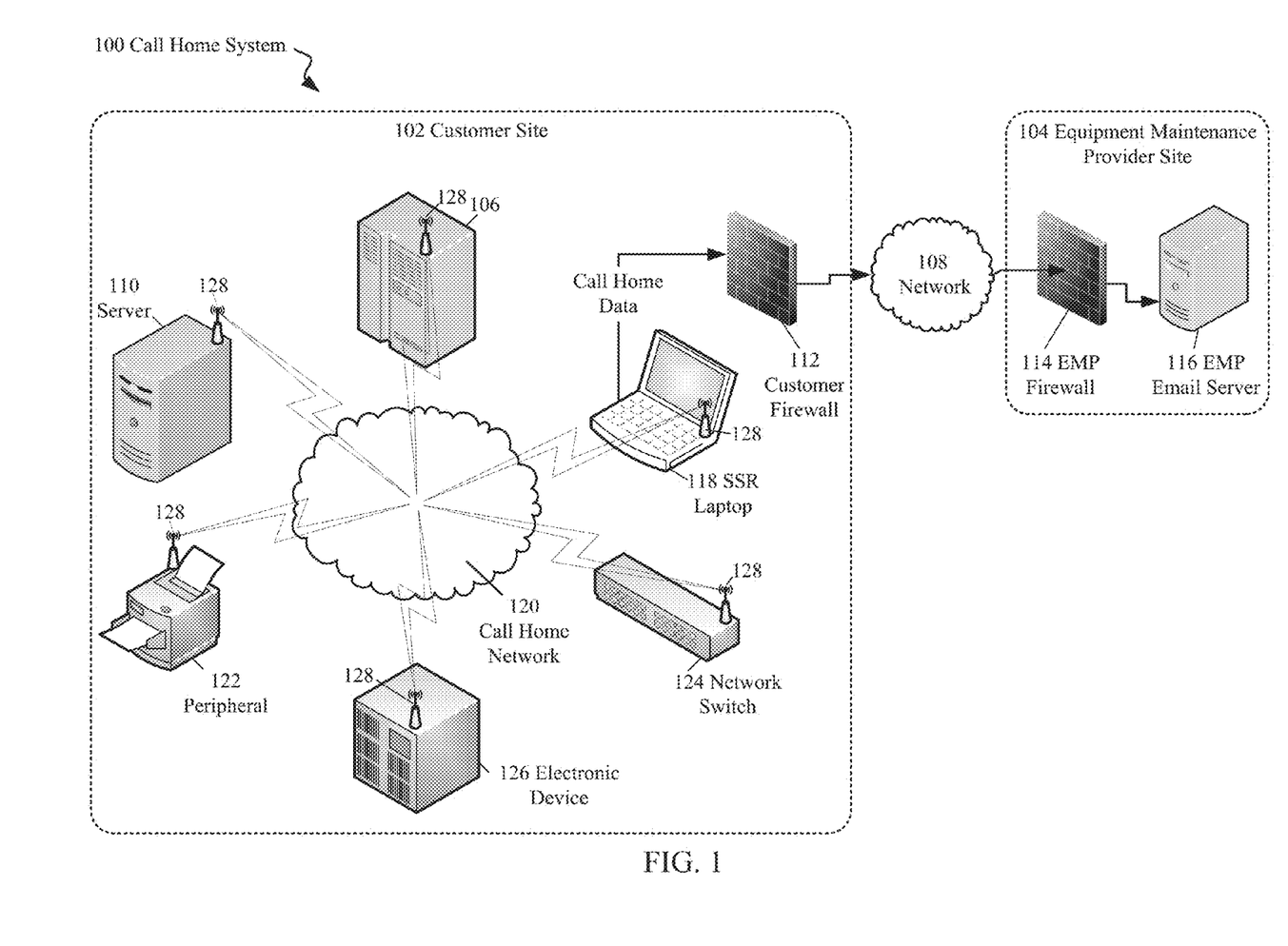
FIG. 1 is a block diagram depicting a call home system including a group of electronic devices connected by a call home network at a customer site, according to embodiments of the present disclosure.

Certain embodiments relate to a "call home" system designed to provide enhanced reliability of electronic device status reporting to a remote location. FIG. 1 is a block diagram depicting a call home system 100 including a group of electronic systems and/or devices at a customer site 102, interconnected by a call home network 120, according to embodiments of the present disclosure. In embodiments, the electronic devices at customer site 102 can be interconnected, through network 108, to the EMP email server 116 at EMP site 104. Such interconnection can be useful for sending status information and logs from electronic devices at customer site 102 to the EMP email server 116.

According to embodiments, the group of electronic devices can include, for example, data storage device 106, SSR laptop 118, network switch 124, electronic device 126, peripheral device 122 and server 110. The above list is not limiting however; electronic devices at a customer site 102 can include a wide variety of IT, SOHO, home entertainment, "smart" appliance, and other types of electronic devices and/or systems. Such devices can include high-performance computers (HPCs), supercomputers, personal computers (PCs), clusters of storage devices and/or servers, telephony equipment, peripherals, e.g., printers, scanners and copiers, and network devices such as routers, switches and hubs.

Each of the electronic devices at customer site 102 can be configured with a wireless element 128, which can be useful in enabling local communication to any of the other electronic devices at customer site 102. According to embodiments, wireless element 128 can include a transmitting element having a radio-frequency (RF) transmitting circuit and a transmitting antenna, and a receiving element having a receiving antenna and an RF receiving circuit. In some embodiments, the transmitting element and the receiving element may be integrated into one electronic component or module, and in some embodiments the transmitting antenna and the receiving antenna may be combined into one physical unit.

According to embodiments, each transmitting element is configured to broadcast a "beacon" signal, which can include a Unique Identifier (UID) or Universally Unique Identifier (UUID) that provides a unique digital identifying code for its respective electronic device. Similarly, each receiving element is configured to receive the identifying beacon signal(s) broadcast from the transmitting element(s) of other electronic device(s). The transmitting and receiving of identifying beacon signals including a UID or UUID can be useful for establishing a first, local electronic communication path between electronic devices located within a wireless communication range.

According to embodiments, beacon identifying signals can be broadcast over a class of Bluetooth low energy (LE) devices, which may generally have a communication range of less than 100 m. In some embodiments, the beacon signal can be a BlueBeacon or an iBeacon signal, and in some embodiments the beacon signal can be transmitted over a wireless fidelity (Wi-Fi) connection or a wireless local-area network (WLAN). In some embodiments, the beacon signal can be transmitted over a wired connection, such as a virtual local-area network (VLAN) or a LAN, between the electronic devices. Call home network 120 includes the wireless and/or wired devices and media that enable communication between electronic devices at customer site 102.

According to embodiments, each electronic device at customer site 102 can include a software package, module or add-on configured to manage the sending and receiving of beacon signals, and subsequent communication, i.e., sharing of electronic device status, between electronic devices. Such a software package can also be useful to manage the transmission of collected electronic device status information to EMP email server 116 at EMP site 104. In some embodiments, such a software package may be installed and/or configured by the manufacturer of the electronic device(s), and in some embodiments the software package may be installed and/or configured by an EMP.

According to embodiments, a second, remote electronic communication path can be established from one of the electronic devices, e.g., SSR laptop 118, at customer site 102, over network 108 to EMP email server 116 of EMP site 104. Such a path may also include network security devices such as customer firewall 112 and EMP firewall 114. According to embodiments, network 108 can be the Internet, a wide-area network (WAN), or a proprietary network such as an intranet. In embodiments, network 108 may be either a public or private network, and can support various types of secure communication schemes such as Hypertext Transfer Protocol Secure (HTTPS) and virtual private networks (VPNs). Electronic device status data can be sent over network 108 using a variety of data formats, e.g., text files or email, by using the Simple Mail Transfer Protocol (SMTP).

FIG. 1 depicts SSR laptop 118 connected to EMP email server 116 over network 108, however this depiction is not limiting; according to embodiments, any of the electronic devices located at customer site 102 can be configured to establish a remote connection to EMP email server 116. In the event that all of the electronic devices at customer site 102 cannot establish a connection to EMP email server 116 over network 108, an SSR laptop 118, brought temporarily to customer site 102 by a CE or SSR, can be used to establish the connection. According to embodiments, the SSR laptop 118 is configured to send and receive beacon signals to and from the electronic devices at customer site 102, collect and consolidate their respective status information/logs, subsequently establish a connection with EMP email server 116 over network 108 and transmit the collected status information.

Customer site 102 can include a customer firewall 112, which may be a software-based or hardware-based firewall, and may be configured to protect electronic devices at customer site 102 from unauthorized access to network 108. Customer site 102 may also employ digital certificates and/or other network security devices and schemes to protect its electronic devices.

EMP site 104 can include an EMP firewall 114, which can be a software-based or hardware-based firewall, and may be configured to protect EMP email server 116 from being accessed by unauthorized devices connected to network 108. EMP site 104 may also employ digital certificates and/or other network security devices and schemes to protect EMP email server 116.

According to embodiments, EMP email server 116 is configured to receive email from customer site 102, and in response, send this email to a designated individual, e.g., a CE or SSR, and/or an automated response system. If email from customer site 102 includes information requiring a response, either the designated individual or the automated response system can initiate the appropriate service action.

According to embodiments, status information sent from customer site 102 to EMP site 104 can include a wide variety of data types. For example, electronic device status information can include configuration information, software and hardware versions, detected network threats, equipment test results and recommended service actions. A more complete list of example electronic device status data types information is contained in Table 1.

TABLE 1

Example Electronic Device Status Data Types

| Data Type | Data Item Descriptions |
|---|---|
| Configuration | Currently running hardware/software configuration |
| | Technology features |
| Crash/Diagnostic | Test description and effects of failure information |
| | Total number of failures encountered when running the diagnostic test |
| | Ending status of diagnostic or crash |
| Environmental | Equipment manufacturer name, device host name, and serial number |
| | Problem case number, technology, problem code, problem details, resolution recommendation(s) |
| | Test description and effects of failure information |
| | Total number of failures encountered when running diagnostic test(s) |
| | Status indicating failure or failure recovery |
| Inventory | Device and module serial numbers |
| | Device host name |
| | Device and module hardware and software versions |
| | Device and module part numbers |
| | Module card type |
| | Date and time of configuration update |
| License | License package name/ID number |
| | Installation status |
| | License count |
| | Expiration date |
| Performance | Performance issue overview; problem details and recommendation(s) |
| | Individual test details; test name, recommendation, failure count, end status |
| Telemetry | Telemetry detection statistics, per interface |
| | Firewall connections, connection per second |
| Threat | Security threat detection rate |
| | Security threat detection statistics |
| | Latest target and latest attacker |

Various aspects of the present disclosure may be useful for enhancing the implementation of reliability, availability, and serviceability (RAS) for electronic devices at a customer site by increasing the reliability and timeliness of electronic device status reporting to an EMP server. Such increased reliability of electronic device status reporting can result in more reliable service actions such as software updates, proactive diagnostics, responses to hardware failures, security threats and other issues which may decrease reliability of customer electronic devices.

According to embodiments, interconnected electronic devices at a customer site can overcome network connectivity impediments between the customer site and the EMP site, and transmit, by proxy, electronic device status data to the remote server at an EMP site. Such proxy transmission can be useful when some of the electronic devices at a customer site do not have access to a network and/or the EMP site.

Aspects of the present disclosure can be embedded into the operating system and/or software base of electronic products, and can be included with electronic product service contracts. Transmission by proxy of electronic device status data can be useful in applications where a customer prefers to have all outbound network traffic sourced from a single electronic device or system. Such transmission may not require changes to the customer firewall configuration, or the issuance of additional electronic digital certificates, if the selected electronic device already has access to the firewall. Aspects of the present disclosure can be useful for providing secure, reliable transmission, over a secured network, of electronic device status data to an EMP server.

Embodiments of the present disclosure can be useful in providing cost-effective transmission of electronic device status of customer electronic devices and systems, by using existing and proven wireless, networking and software technologies.

Figure 2:
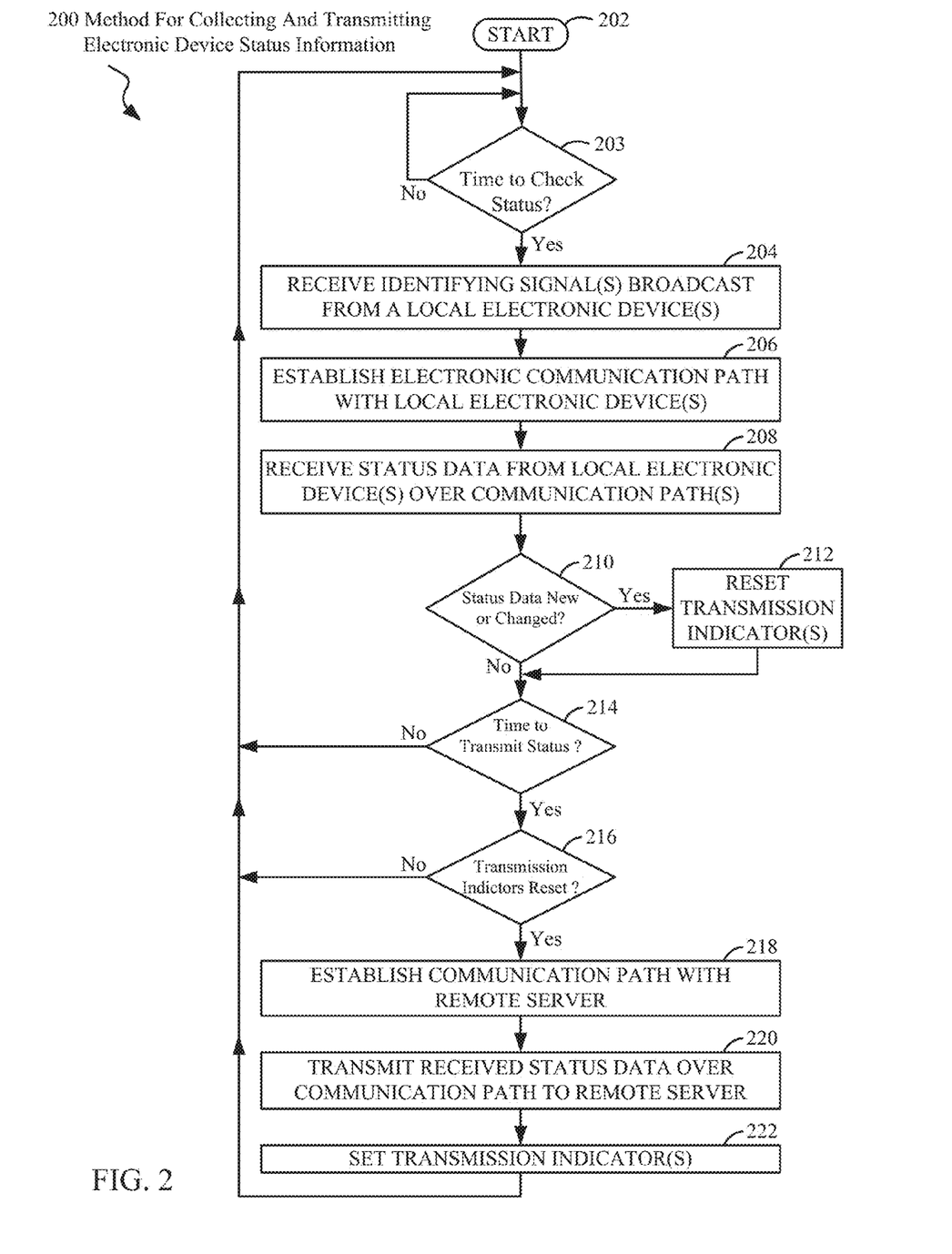
FIG. 2 is a flow diagram illustrating a method for collecting and transmitting electronic device status information, according to embodiments consistent with the figures.

FIG. 2 is a flow diagram illustrating a method 200 for collecting and transmitting electronic device status information, according to embodiments consistent with the figures. The operations of method 200 may generally correspond to FIG. 1 and its associated description. The process 200 moves from start 202 to operation 203.

At operation 203, a determination is made regarding communicating and checking device status of electronic devices local to a customer site. In embodiments, the determination may be based upon input from a software "timer" module, a hardware timing circuit, an interrupt, or other time-based hardware device or software module. Operation 203 may be useful in maintaining a specified time interval between successive electronic device status checks. Maintaining a specified checking time interval can ensure that the frequency of status checks does not inappropriately stress electronic device resources such as a processor circuit, while providing checks frequently enough to detect significant electronic device status changes in a timely manner. In some embodiments, the specified time interval between status checks can be preset or "hardwired" in software or hardware within an electronic device. In some embodiments, the specified time interval can be set or modified by a customer or CE.

In some embodiments, the frequency or periodicity of communicating and checking device status can be set by a user or CE. For example, at customer sites with electronic devices receiving frequent software updates and/or experiencing system issues, the status checking frequency may be set to once per hour. At other customer sites receiving less frequent software updates and/or experiencing less frequent system issues, the status checking frequency may be set to once per day or once per several days. If the decision is to not communicate and check device status, the process remains at operation 203. If the decision is to communicate and check device status, the process moves to operation 204.

Operation 204 generally refers to receiving an identifying signal or beacon broadcast from at least one local electronic device at a customer site. According to embodiments, each electronic device at a customer site can be configured to repeatedly broadcast an identifying beacon signal to reveal its presence to other, nearby electronic devices. Similarly each electronic device at the customer site can also be configured to receive and respond to beacons from other nearby electronic devices.

According to embodiments, the identifying beacon signal can be a wireless beacon, a Bluetooth beacon, a Wi-Fi signal, or a signal broadcast over a LAN. In embodiments, the beacon signal can include a UID or a UUID. In some embodiments, a service electronic system such as a CE or SSR laptop, can be introduced to the customer site and can interact with installed electronic devices at the site through the transmitting and receiving of beacon signals. Once an identifying signal is received, the process moves to operation 206.

Operation 206 generally refers to establishing an electronic communication path between electronic devices at the customer site. In response to the receiving of the identifying beacon signal, a local electronic communication path is established, over a call home network, between electronic devices at the customer site. A software module installed in each of the electronic devices can use a UID or UUID within a broadcast beacon signal to identify nearby devices and send data through a wired or wireless link, in order to establish and test a local electronic communication path between the devices. In some embodiments, for example, the devices can be data storage units at the customer site. Data can be exchanged between electronic devices through local electronic communication paths including, but not limited to, a wireless link, a Bluetooth link, a Wi-Fi connection, a WLAN, a VLAN and a LAN. Once the local electronic communication path is established, the process moves to operation 208.

Operation 208 generally refers to transmitting and receiving status data between electronic devices at the customer site over the established local electronic communication path. According to embodiments, the local electronic communication path(s), or call home network, established in operation 206 can be used to transmit electronic device status data between electronic devices at the customer site. This communication capability can be useful for creating duplicate copies of each electronic device's status data within other electronic devices at the customer site. In embodiments, each electronic device can periodically send its status data to other electronic devices, at a frequency determined by a user or CE. A user or CE may also select, through setting parameters, a group of data items to include in the data sent to other electronic devices. A group of data items may include, for example, items from Table 1 such as electronic device code levels, serial numbers, detected security threats and recent software or hardware failure issues. Once electronic device status data is received, the process moves to operation 210.

At operation 210, a determination is made regarding whether any of the electronic device status data received, in operation 208, from electronic devices at the customer site, is new or has changed from a prior set of received device status data. Determining whether electronic device status data is new or has changed can involve a comparison, by a software module, of a prior set of device status data to a current set. If the device status data is new or has changed, the process moves to operation 212. If the device status data has not changed, the process moves to operation 214.

Operation 212 generally refers to resetting one or more transmission indicators. According to embodiments, a transmission indicator can be a value of a text string in a file, a variable in a program, or a database entry that can be set to a particular value indicating that an electronic status data item has been previously transmitted to a remote server. In some embodiments, each electronic device status data item can have a corresponding transmission indicator. In some embodiments, one transmission indicator can be used for a set of electronic device status data corresponding to a particular electronic device. A transmission indicator can be useful in preventing redundant transmissions of status data that has not changed since the last transmission of status data to the EMP server. In some embodiments, transmission indicators can be stored with electronic device status data, within an electronic device.

In embodiments, transmission indicators can be reset in response to a change in at least one electronic device status data item. For example, a detected security threat, new software version, or hardware fault may each trigger the resetting of a respective transmission indicator. Resetting transmission indicators can be useful for flagging electronic device status data that is new or has changed since the most recent status transmission, and which may be retransmitted to the EMP server, in order to initiate a service action. Once the transmission indicators are reset, the process moves to decision 214.

At operation 214, a determination is made regarding transmitting the received electronic device status data to the remote EMP server. In embodiments, the determination may be based upon input from a software "timer" module, a hardware timing circuit, an interrupt, or other time-based hardware device or software module. Operation 214 may be useful in maintaining a specified time interval between successive electronic device status transmissions. Maintaining a specified transmission time interval can ensure that the transmission frequency does not inappropriately stress electronic devices and resources such as a processor circuit, and that redundant status transmissions are not sent to the remote EMP server. A specified transmission time interval can be useful in providing status transmissions frequently enough to alert the EMP server of significant electronic device status changes in a timely manner. In some embodiments, the specified time interval between status transmissions can be preset or "hardwired" in software or hardware within an electronic device. In some embodiments, the specified time interval can be set or modified by a customer or CE. If the decision is not to transmit device status, the process returns to operation 203. If the decision is to transmit device status, the process moves to operation 216.

At operation 216, a determination is made regarding whether the transmission indicators(s) have been reset. Determining whether a transmission indicator has been reset may involve the comparison, by a software module, of a prior set of transmission indicators to a current set. If the transmission indicators have not been reset, the process returns to operation 203. If the transmission indicators have been reset, the process moves to operation 218.

Operation 218 generally refers to establishing a second, remote, electronic communication path with the remote EMP server. According to embodiments, each of the electronic devices at the customer site can be configured to periodically attempt to establish a remote connection with a remote EMP server. Configuring each of electronic devices to attempt to establish such a connection can be useful in increasing the probability of one of them successfully establishing such a connection. Repeated attempts, by multiple electronic devices, at establishing such a connection may be useful in overcoming security measures such as firewalls and/or intermittent or inconsistent network connectivity to the remote server. In some embodiments, the frequency or periodicity of the attempts to establish the remote electronic communication path can be set by a user or CE. According to embodiments, the network interconnecting the customer site with an EMP site can be the Internet, a WAN, or a proprietary network.

In some embodiments where the electronic devices installed at a customer site are unable to establish connectivity to the EMP site, a "service device" such as a CE laptop can be used to consolidate and transmit the collected electronic device status data, once it establishes a connection to the EMP site. A CE or SSR laptop may be useful in establishing such a connection and performing the status data transmission because it may be preconfigured with appropriate access and security credentials to successfully establish an electronic communication path through firewalls and other security devices. Once the second electronic communication path is established, the process moves to operation 220.

Operation 220 generally refers to transmitting the received status data over the second, remote electronic communication path to the remote server. According to embodiments, an electronic device at the customer site that has established, in operation 218, an electronic communication path to the remote server, subsequently transmits electronic device status data it has accumulated to the remote server at the EMP site. A user or CE may select, through setting parameters, a group of data items to include in the data transmitted to the remote server. In some embodiments, the transmission of data to the remote server can occur in response to the resetting of at least one electronic device status data transmission indicator. The electronic device transmitting the status data to the remote server can be installed at the customer site or, in certain circumstances can be a CE or SSR laptop. In some embodiments, the electronic device status data to be transmitted can be prioritized so that the status data of the electronic device performing the transmission is sent prior to the status data consolidated from other electronic devices at the customer site. Once the received status data is transmitted, the process moves to operation 222.

Operation 222 generally refers to setting transmission indicators corresponding to the status data transmitted for each electronic device. In some embodiments, each electronic device status data item can have a corresponding transmission indicator. In some embodiments, one transmission indicator can be used for a set of electronic device status data corresponding to a particular electronic device. Once the transmission indicators have been set, the process returns to decision 203.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
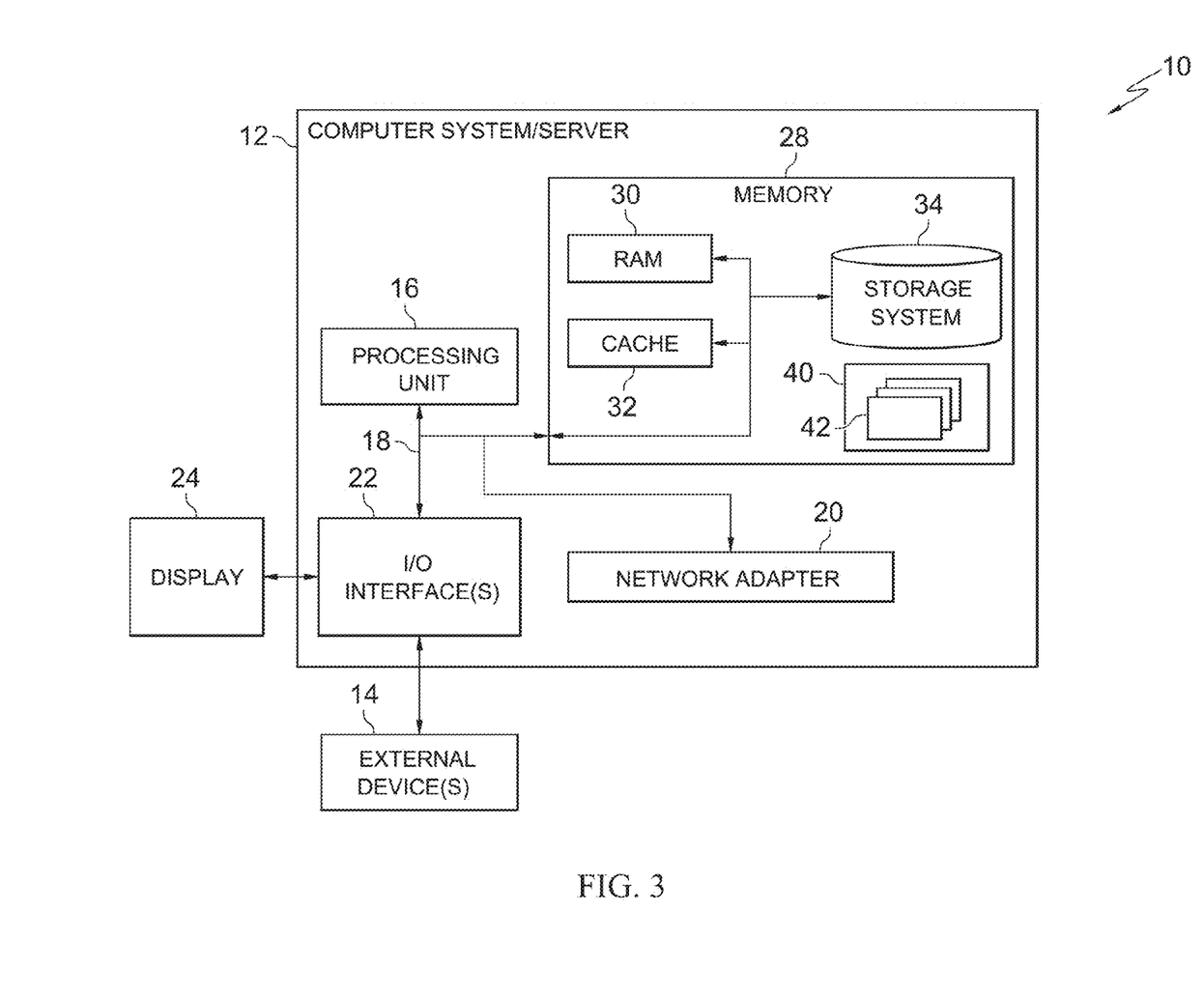
FIG. 3 depicts a cloud computing node according to an embodiment of the present disclosure.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, at least one processor or processing units 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, at least one application programs, other program modules, and program data. Each of the operating system, at least one application programs, other program modules, and program data or some combination thereof, may include an implementation of a networking environment. Program modules 42 generally carry out the functions and/or methodologies of embodiments of the invention as described herein.

Computer system/server 12 may also communicate with at least one external devices 14 such as a keyboard, a pointing device, a display 24, etc.; at least one devices that enable a user to interact with computer system/server 12; and/or any devices (e.g., network card, modem, etc.) that enable computer system/server 12 to communicate with at least one other computing devices. Such communication can occur via Input/Output (I/O) interfaces 22. Still yet, computer system/server 12 can communicate with at least one networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
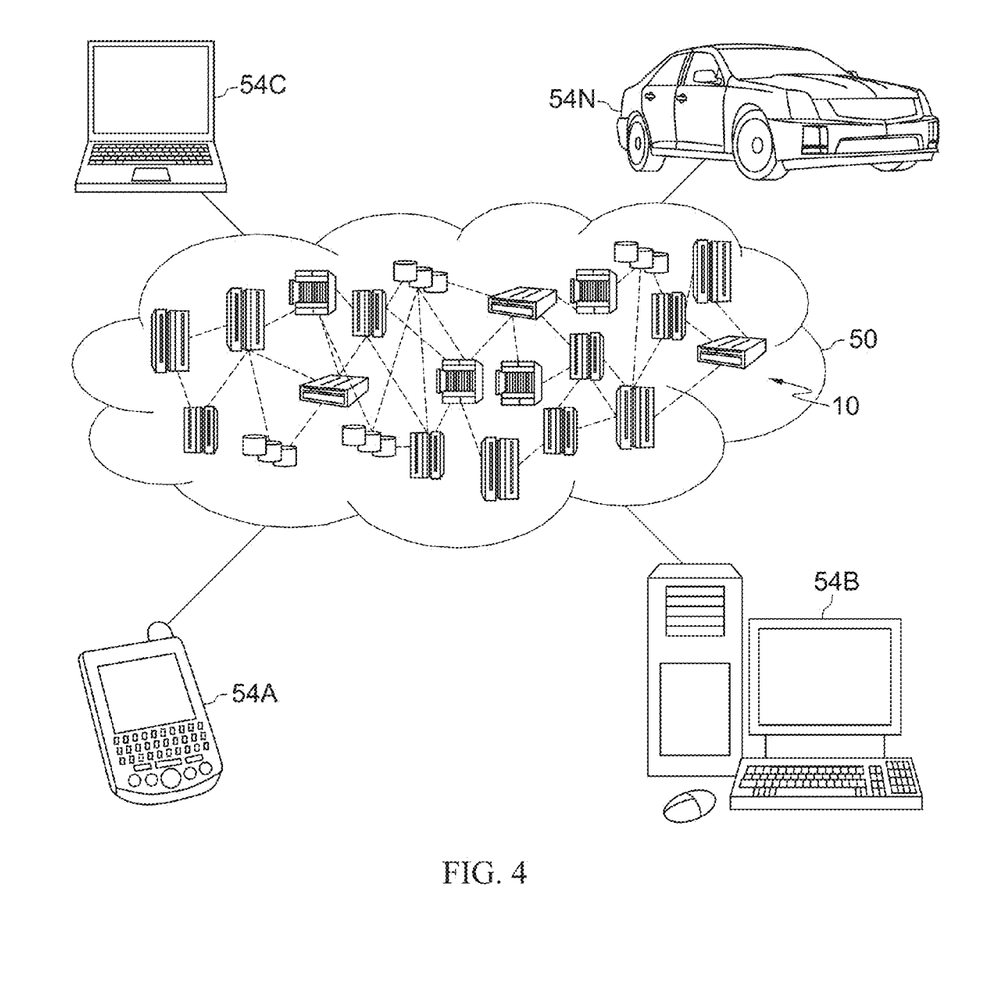
FIG. 4 depicts a cloud computing environment according to an embodiment of the present disclosure.

Referring now to FIG. 4, illustrative cloud computing environment 50 is depicted. As shown, cloud computing environment 50 comprises at least one cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in at least one network, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
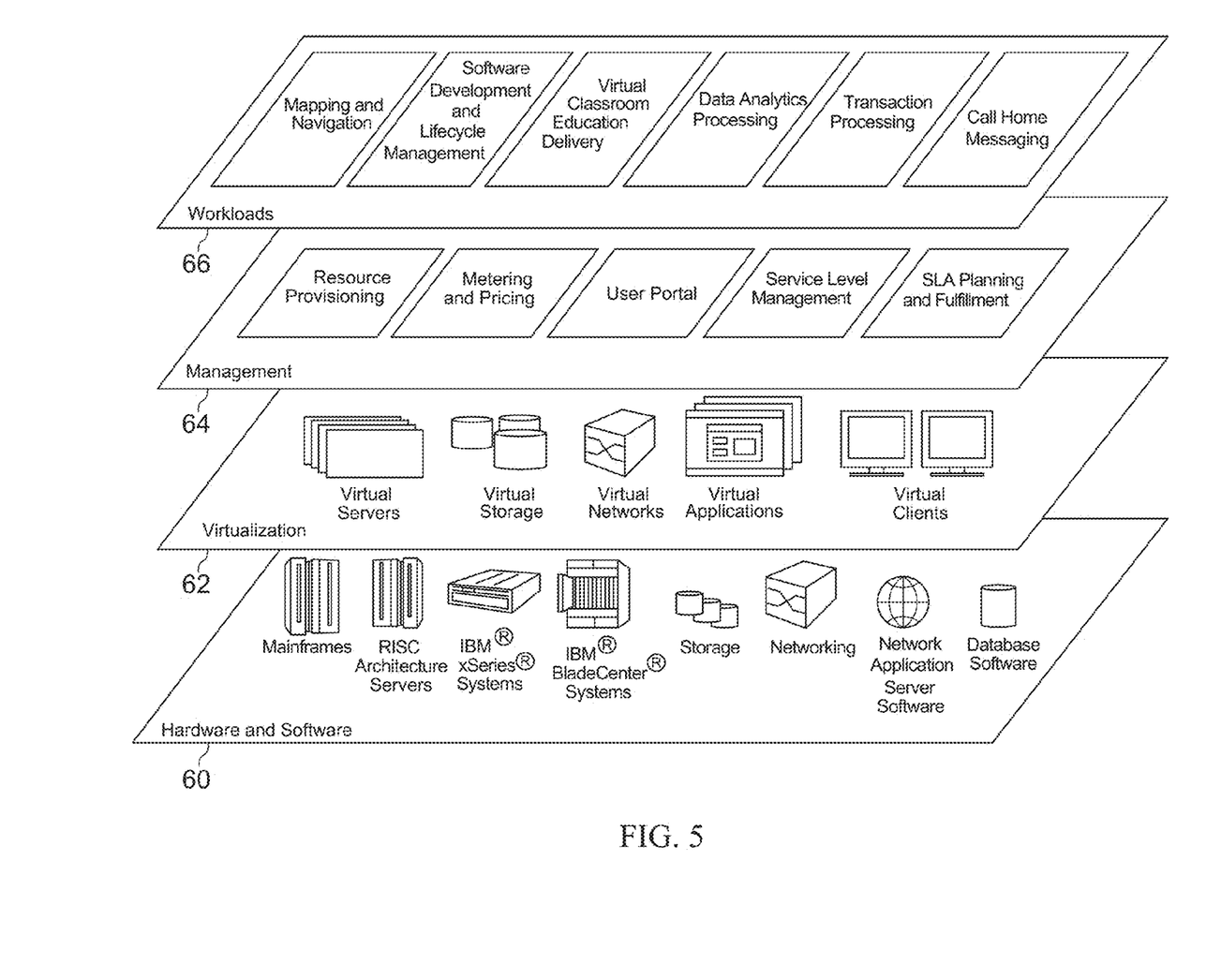
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and call home messaging 96.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of at least one programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises at least one executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product comprising at least one computer readable storage medium having program instructions embodied therewith, the program instructions executable by at least one computer processor circuit to cause the at least one computer processor circuit to perform a method comprising:

receiving, with a first electronic device, an identifying signal broadcast from a second electronic device;

establishing, in response to the receiving the identifying signal, a first electronic communication path between the first electronic device and the second electronic device;

receiving, at the first electronic device, a second set of status data of the second electronic device, the second set of status data transmitted from the second electronic device over the first electronic communication path;

establishing a second electronic communication path between the first electronic device and a remote server;

transmitting, over the second electronic communication path, from the first electronic device to the remote server, a first set of status data of the first electronic device and the second set of status data;

setting, in response to the transmitting, a first transmission indictor associated with the first set of status data and a second transmission indictor associated with the second set of status data;

resetting, in response to a change of at least one of the first set of status data and the second set of status data, at least one transmission indictor corresponding to the at least one set of changed status data.

2. The computer program product of claim 1, the method further comprising transmitting over the second electronic communication path, in response to the resetting of at least one of the first transmission indictor and the second transmission indictor, of at least one of the first set of status data and the second set of status data corresponding to the at least one reset transmission indictor.

3. The computer program product of claim 1, wherein the identifying signal is selected from the group consisting of: a wireless beacon, a Bluetooth beacon, a Wi-Fi signal, and a signal broadcast over a local-area network (LAN).

4. The computer program product of claim 1, wherein the first electronic communication path between the first electronic device and the second electronic device is selected from the group consisting of: a wireless link, a Bluetooth link, a wireless fidelity (Wi-Fi) connection, a wireless local-area network (WLAN), a virtual local-area network (VLAN) and a local-area network (LAN).

5. The computer program product of claim 1, wherein the second electronic communication path between the first electronic device and the remote server is selected from the group consisting of: the Internet, a wide-area network (WAN), and a proprietary network.

6. The computer program product of claim 1, the method further comprising selecting, in response to user-specified parameters, a group of data items to include in the first set of status data and in the second set of status data transmitted from the first electronic device to the remote server.

7. The computer program product of claim 1, wherein the second set of status data of the second electronic device is received in response to the establishing of the second electronic communication path.

8. The computer program product of claim 1, wherein the first electronic communication path is established in response to a set of broadcasts, by the second electronic device, of the identifying signal.

9. The computer program product of claim 1, wherein the second electronic communication path is established in response to a set of attempts, by the first electronic device, at establishing the second electronic communication path between the first electronic device and the remote server.

* * * * *